No. 629,335. Patented July 25, 1899.
F. L. BRYANT.
STEERING DEVICE FOR TANDEM BICYCLES.
(Application filed May 20, 1898.)
(No Model.)
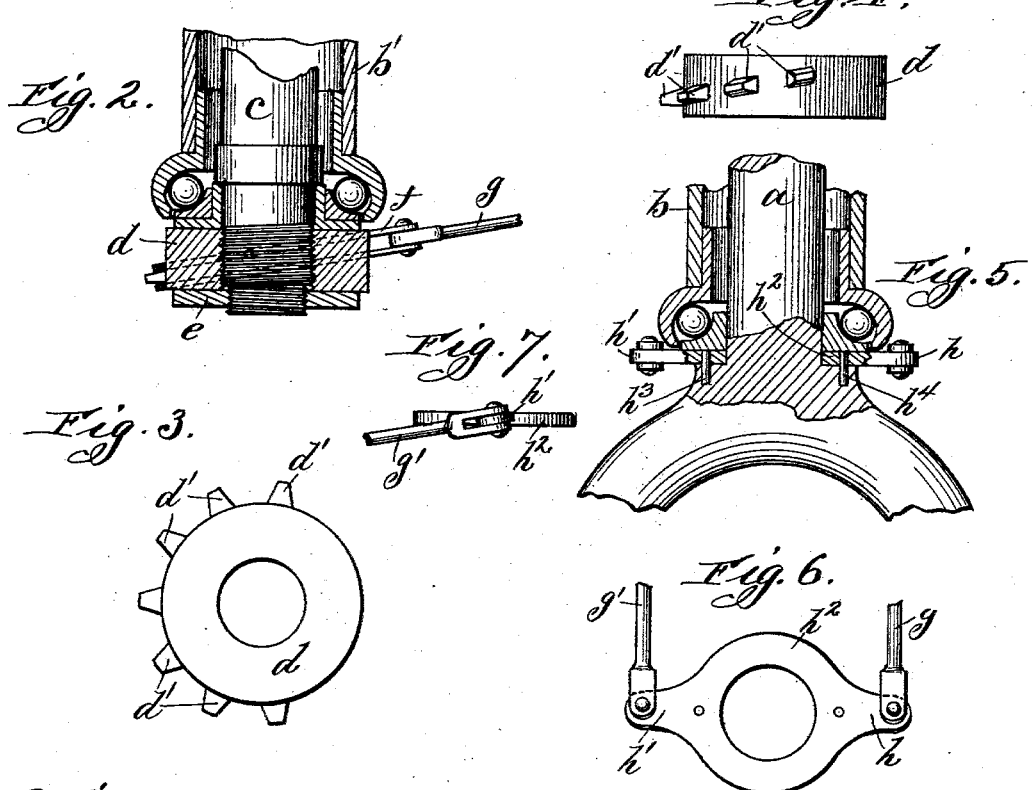

UNITED STATES PATENT OFFICE.

FRED L. BRYANT, OF CHICAGO, ILLINOIS.

STEERING DEVICE FOR TANDEM BICYCLES.

SPECIFICATION forming part of Letters Patent No. 629,335, dated July 25, 1899.

Application filed May 20, 1898. Serial No. 681,185. (No model.)

*To all whom it may concern:*

Be it known that I, FRED L. BRYANT, a citizen of the United States, residing at Chicago, in the county of Cook and State of Illinois, have invented a certain new and useful Improvement in Steering Devices for Tandem Bicycles, of which the following is a full, clear, concise, and exact description, reference being had to the accompanying drawings, forming a part of this specification.

My invention relates to a steering device for tandem bicycles, my object being to provide an improved form of steering connection between the front and rear steering-posts of a tandem bicycle.

It has been the practice to provide upon the lower end of the rear steering-post a sprocket-pinion with which a short chain engages, the ends of the chain being connected with rods which extend forward and are connected with the forward steering-post, the forward ends of each rod being usually connected with laterally-extending arms carried upon the front steering-post, between the fork thereof and the lower end of the tubing of the bicycle-frame in which the front steering-post is journaled. Due to the fact that the rods do not extend perpendicularly between the two steering-posts, but occupy an oblique position relatively thereto, there is a tendency to throw the chain from the teeth of the sprocket-wheel, and undue wear and strain is imposed upon the chain and pinion. It is the principal object of the present invention to provide a construction which will overcome this objection, and in accordance therewith the sprocket-pinion, which is mounted upon the lower end of the rear steering-post, is provided with a series of teeth which lie in a plane oblique to the plane of rotation of the pinion, whereby the chain and the teeth of the pinion may be placed in substantially the same plane. As the movement or partial rotation of the rear steering-post is necessarily quite small, the movement does not serve to materially move the teeth out of the plane of the chain, and in consequence the chain is always in substantially the same plane as the teeth of the pinion, and hence there is no tendency for it to be thrown therefrom, and, furthermore, the wear and lateral strain upon the teeth and the chain are avoided.

I have illustrated my invention in the accompanying drawings, in which—

Figure 1 is a view illustrating a portion of the frame of a bicycle embodying my invention. Fig. 2 is a sectional view of the sprocket-pinion and the lower end of the rear steering-post. Fig. 3 is a plan view of the sprocket-pinion. Fig. 4 is a side view thereof. Fig. 5 is a sectional view of the front steering-post. Fig. 6 is a plan view of the laterally-extending arms provided upon the front steering-post. Fig. 7 is a side view thereof.

Like letters refer to like parts in the several figures.

The front steering-post $a$ is journaled within the front tube $b$ of the frame, while the rear steering-post $c$ is journaled within the tube $b'$ of the machine. Upon the lower end of the rear steering-post $c$ is mounted a pinion $d$, carrying upon the periphery a series of teeth $d'$ $d'$, which rest in a plane oblique to the plane of the hub and the plane of rotation thereof—that is, the row of teeth on the periphery of the wheel-body lies in a course which is oblique to the plane of rotation of the wheel. The teeth are preferably provided only upon the sides and rear of the pinion and are omitted in front, since the partial rotation of the pinion is necessarily small and this partially-toothed pinion is adequate for the purpose. In practice I have preferably screwed the hub of the pinion $d$ upon the threaded end of the steering-post $c$ and maintain the same in position by a check-nut $e$. A sprocket-chain $f$ engages the teeth of the pinion and is connected at the opposite ends with a pair of rods $g$ $g'$, the forward ends of which are pivoted, respectively, to the arms $h$ $h'$, carried upon a collar $h^2$, secured to the front steering-post $a$. As shown more clearly in Fig. 6, the collar $h^2$ rests against a shoulder on the steering-post $a$ and is maintained against rotation by a pair of pins $h^3$ $h^4$. The arms $h$ $h'$, as shown more clearly in Fig. 7, are bent into an angular position, so as to lie in the plane of the rods $g$ $g'$. By this construction the connecting-rods $g$ $g'$, the chain $f$, and the teeth of the pinion all lie in a common plane, and as the steering-posts are rotated through a very small angle during the running of the machine the plane of the teeth is not materially moved out of the plane of the sprocket-chain, and in consequence there is no tendency to throw the sprocket-chain from the pinion or to cause the same to bind or to subject the same to undesirable wear or strain.

Having described my invention, what I claim as new, and desire to secure by Letters Patent, is—

1. The combination with a sprocket-wheel provided upon the periphery with a series of teeth lying in a plane oblique to the plane of rotation thereof, of a sprocket-chain engaging said teeth and adapted to lie substantially in the plane thereof, substantially as described.

2. The combination with the rear steering-post, of a sprocket-wheel mounted upon the lower end thereof and provided with a series of teeth lying in a plane oblique to the plane of rotation of the wheel, a chain engaging said teeth and lying substantially in the plane thereof, and a connection between said chain and the front steering-post, substantially as described.

In witness whereof I have hereunto subscribed my name in the presence of two witnesses.

FRED L. BRYANT.

Witnesses:
CHAS. L. AMES,
W. CLYDE JONES.